US008194017B2

(12) United States Patent
Wang et al.

(10) Patent No.: US 8,194,017 B2
(45) **Date of Patent: *Jun. 5, 2012**

(54) LIQUID CRYSTAL DISPLAY, DRIVER CHIP AND DRIVING METHOD THEREOF

(75) Inventors: Chih-Sung Wang, Chubai (TW); Chih-Hsiang Yang, Yangmei Township, Taoyuan County (TW); Chao-Liang Lu, Jhongli (TW)

(73) Assignee: AU Optronics Corp., Hsin-Chu (TW)

( * ) Notice: Subject to any disclaimer, the term of this patent is extended or adjusted under 35 U.S.C. 154(b) by 535 days.

This patent is subject to a terminal disclaimer.

(21) Appl. No.: 12/385,441

(22) Filed: Apr. 8, 2009

(65) Prior Publication Data

US 2009/0201284 A1 Aug. 13, 2009

Related U.S. Application Data

(63) Continuation of application No. 12/232,438, filed on Sep. 17, 2008, which is a continuation of application No. 11/034,858, filed on Jan. 14, 2005, now Pat. No. 7,483,006.

(30) Foreign Application Priority Data

Jul. 15, 2004 (TW) ............................... 93121223 A

(51) Int. Cl.
*G09G 3/36* (2006.01)
*G06F 3/038* (2006.01)

(52) U.S. Cl. ............ 345/87; 345/98; 345/100; 345/204; 345/213

(58) Field of Classification Search ............ 345/87–104, 345/204–214, 690
See application file for complete search history.

(56) References Cited

U.S. PATENT DOCUMENTS

| | | | | |
|---|---|---|---|---|
| 6,657,622 | B2 | 12/2003 | Park | |
| 7,061,478 | B1 * | 6/2006 | Moyer | 345/204 |
| 7,260,494 | B2 * | 8/2007 | Weiss | 702/120 |
| 7,289,095 | B2 * | 10/2007 | Park et al. | 345/98 |
| 2001/0013850 | A1 * | 8/2001 | Sakaguchi et al. | 345/87 |
| 2003/0038771 | A1 * | 2/2003 | Sunohara | 345/103 |
| 2004/0075636 | A1 * | 4/2004 | Pai | 345/103 |
| 2005/0052395 | A1 | 3/2005 | Choi et al. | |
| 2005/0068309 | A1 * | 3/2005 | Chang et al. | 345/204 |
| 2005/0083289 | A1 * | 4/2005 | Yang | 345/100 |
| 2005/0219189 | A1 | 10/2005 | Fukuo | |
| 2005/0219235 | A1 | 10/2005 | Fukuo | |

FOREIGN PATENT DOCUMENTS

| | | |
|---|---|---|
| JP | 11-212672 | 8/1999 |
| JP | 11-242463 | 9/1999 |
| JP | 2005-338727 | 12/2005 |
| TW | 0567459 | 12/2003 |
| TW | 567459 | 12/2003 |

* cited by examiner

*Primary Examiner* — Amare Mengistu
*Assistant Examiner* — Jennifer Zubajlo
(74) *Attorney, Agent, or Firm* — Rabin & Berdo, P.C.

(57) ABSTRACT

A liquid crystal display and the driving method thereof. The LCD includes a timing controller, a plurality of driver chips and a display panel. The driver chips are cascaded together for driving the display panel to display frames. A driver chip includes a differential receiver, a single-ended receiver, a shift register, a differential transmitter, a single-ended transmitter and a pixel driver. The driver chip receives a pixel signal and drives the display panel according to the pixel signal, and outputs the pixel signal to the next driver chip.

37 Claims, 4 Drawing Sheets

304

LIQUID CRYSTAL DISPLAY, DRIVER CHIP AND DRIVING METHOD THEREOF

This application is a continuation application of application Ser. No. 12/232,438, filed on Sep. 17, 2008, which is a continuation application of application Ser. No. 11/034,858, filed on Jan. 14, 2005, now U.S. Pat. No. 7,483,006, and claims the benefit of Taiwan application Serial No. 93121223, filed Jul. 15, 2004, the subject matter of which is incorporated herein by reference.

BACKGROUND OF THE INVENTION

1. Field of the Invention

The invention relates in general to liquid crystal displays, and more particularly to liquid crystal displays and the driver chips of the liquid crystal displays having dual transmitting modes.

2. Description of the Related Art

FIG. 1 shows a conventional liquid crystal display (LCD). LCD 100 includes timing controller 102, n driver chips 104 that are cascaded together, display panel 108, PCB (print circuit board) 106, and glass substrate 110. The timing circuit 102 on PCB 106 is used for outputting pixel signals that are in single-ended type. The first driver chip 104(1) is electrically connected to the timing controller 102. Driver chips 104(1), 104(2), 104(3) . . . 104(n) are cascaded together After diver chip 104(1) receives the pixel signal from the timing controller 102, the pixel signal is sent to driver chip 104(2); driver chip 104(2) then in turn sends this pixel signal to the next driver chip 104(3), and continues in this fashion until the pixel signal is being sent to the last driver chip 104(n). Each driver chip 104 drives panel 108 according to the captured pixel signal. Each driver chip 104 is disposed on the glass substrate 110, and such layout on the glass substrate is referred to as chip on glass (COG).

FIG. 2 shows a conventional driver chip. Between the driver chip 104, the pixel signals are being transmitted in single-ended type. Driver chip 104 includes single-ended receiver 111, single-ended transmitter 112, shift register 113, and pixel driver 114. Single-ended receiver 111 and single-ended transmitter 112 are for example CMOS TTL circuits. Single-ended receiver 111 first receives pixel data, then sends the pixel data to shifter register 113, then shift register 113 in turn sends the pixel data to single-ended transmitter 112 for outputting to next driver chip. Pixel driver 114 retrieves data corresponding to the driver chip from shift register 113 of the chip, and uses the retrieved data to drive the display panel 108.

However, due to the large impedances of glass substrate conducting wires, the pixel signals are severely attenuated when being transmitted through the glass substrate conducting wires disposed between the driver chips. Especially for high resolution LCDs, the number of driver chips required are even greater, and the signal attenuation problem becomes more severe, since the signals have to travel a greater distance, and the application of this type of layout in high resolution LCDs remains a difficult issue.

SUMMARY OF THE INVENTION

It is therefore an object of the invention to provide a liquid crystal display and the driver chip thereof that prevents pixel signals from attenuating during transmitting, and increases the transmitting clock rate.

The invention achieves the above-identified object by providing a liquid crystal display (LCD), which includes a timing controller, a cascaded plurality of driver chips, and a display panel. The timing controller outputs pixel signals to the first driver chip of the driver chips, in which the driver chip receives the pixel signal according to a preset receiving mode, and outputs the pixel signal to the second driver according to a preset output mode, and the pixel signal continues to be transmitted in the same fashion until reaching the last driver chip. Each of the driver chips samples the pixel signals and uses the sampled pixel signals to drive the display panel.

The invention achieves the other above-identified object by providing a method of transmitting data in a LCD. The LCD includes a timing controller, and a first driver chip and a second driver chip that are cascaded together. The method of transmitting data in the LCD includes the following steps. First, a pixel signal is output from the timing controller. Then, the first driver chip receives the pixel signal according to the preset receiving mode, and retrieves the pixel signal. Then, the first driver chip sends the pixel signal to the second driver chip according to the preset output method.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
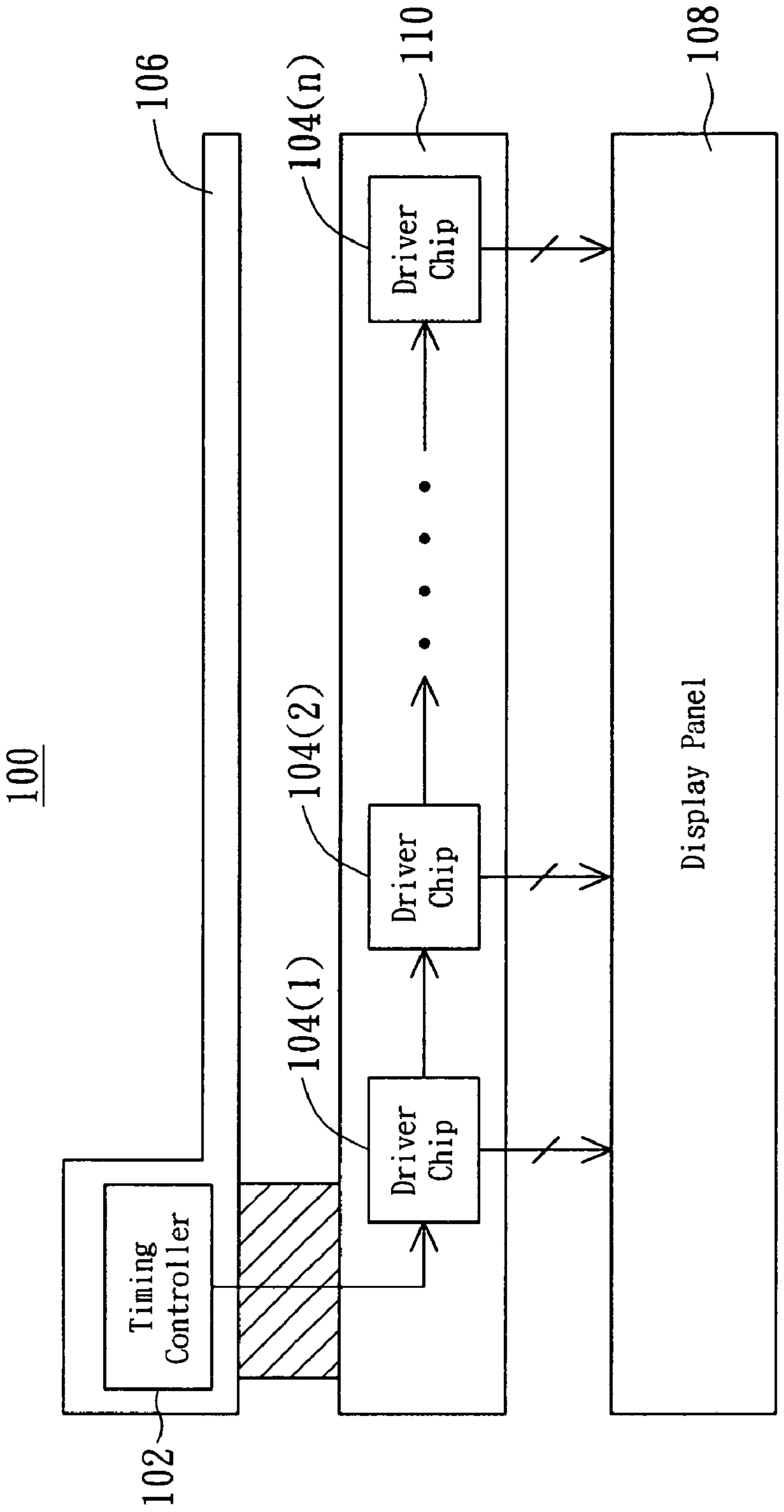
FIG. 1(PRIOR ART)
FIG. 1 (PRIOR ART) shows illustration of a conventional liquid crystal display.
Figure 2:
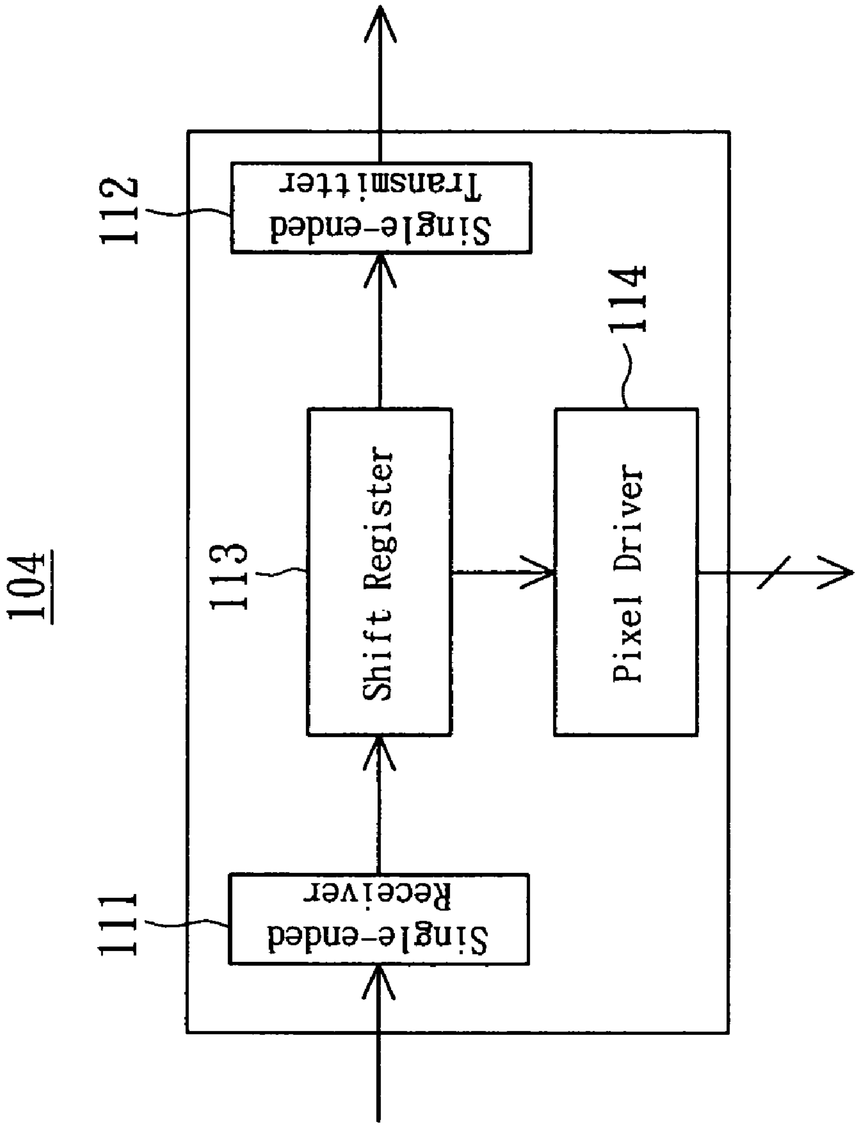
FIG. 2(PRIOR ART)
FIG. 2 shows illustration of a conventional driver chip.
Figure 3:
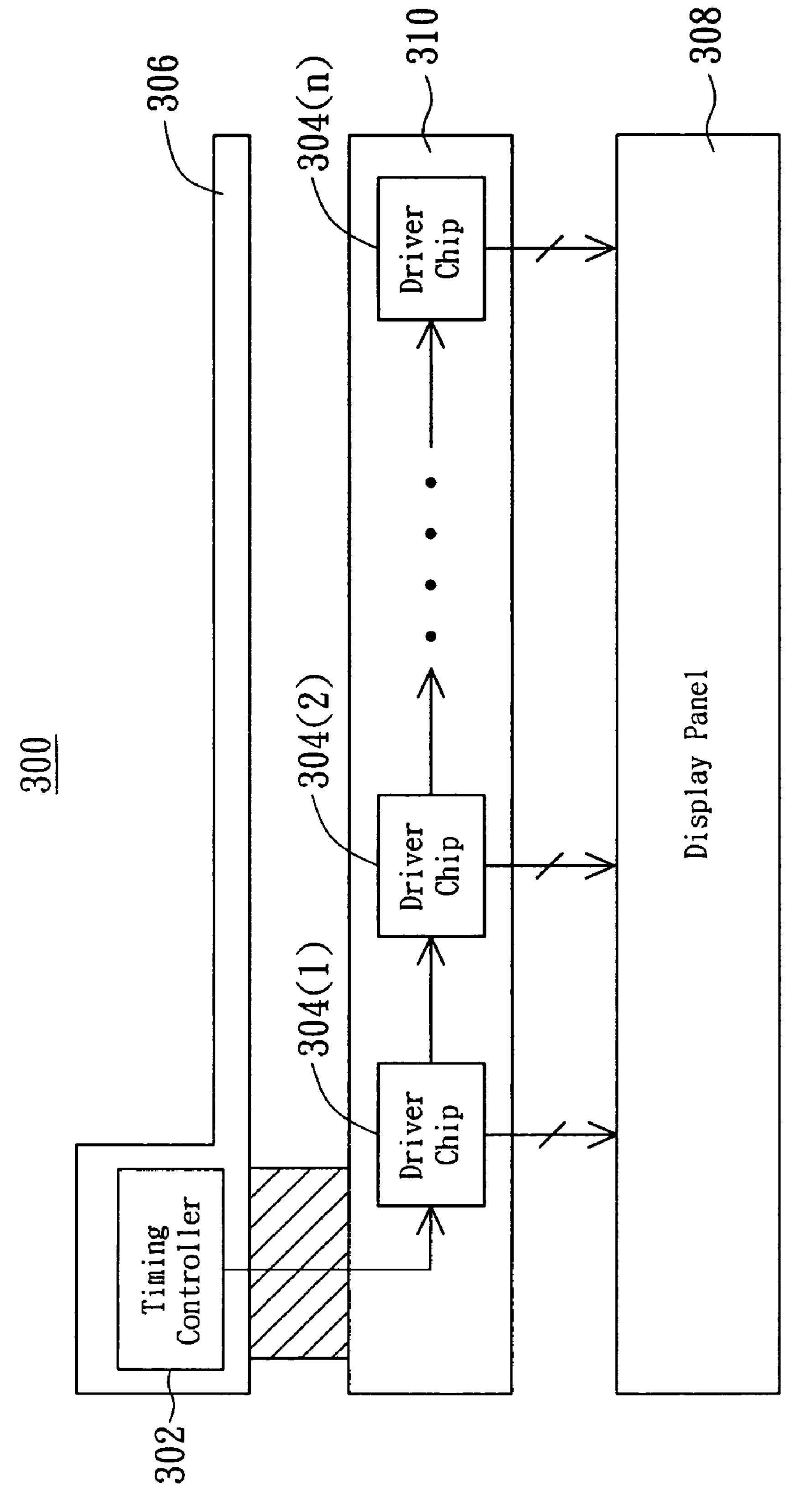
FIG. 3 shows illustration of a driver circuit of a liquid crystal display according to a better embodiment of the invention.

FIG. 3 shows illustration of a driver circuit of a LCD according to a preferred embodiment of the invention. LCD 300 includes a timing controller 302, n driver chips 304 that are cascaded together, a Print Circuit Board (PCB) 306, and a glass substrate 310. Timing controller 302 disposed on PCB 306 outputs a pixel signal, such as in a differential type. First driver chip 304(1) is electrically connected to timing controller 302. Driver chip 304(1), 304(2), 304(3) . . . 304(n) are serially connected. Driver chip 304(1) disposed on glass substrate 310 receives the pixel signal output from timing controller 302, and then sends the pixel signal to next driver chip 304(2), and driver chip 304(2) in turn sends the pixel signal to next driver chip 304(3), and the pixel data continues to be transmitted in this fashion until reaching the last driver chip 304(n). The pixel signal is being transmitted between the driver chip 304 in differential mode, or in alternation between differential mode and single-ended mode. Each driver chip 304 uses the retrieved pixel signals to drive display panel 308. Glass substrate 310 is the base of driver chip 304, and such method of transmitting data through driver chips that are cascaded together, or in an array, is referred to as WOA (Wire on Array).

Figure 4:
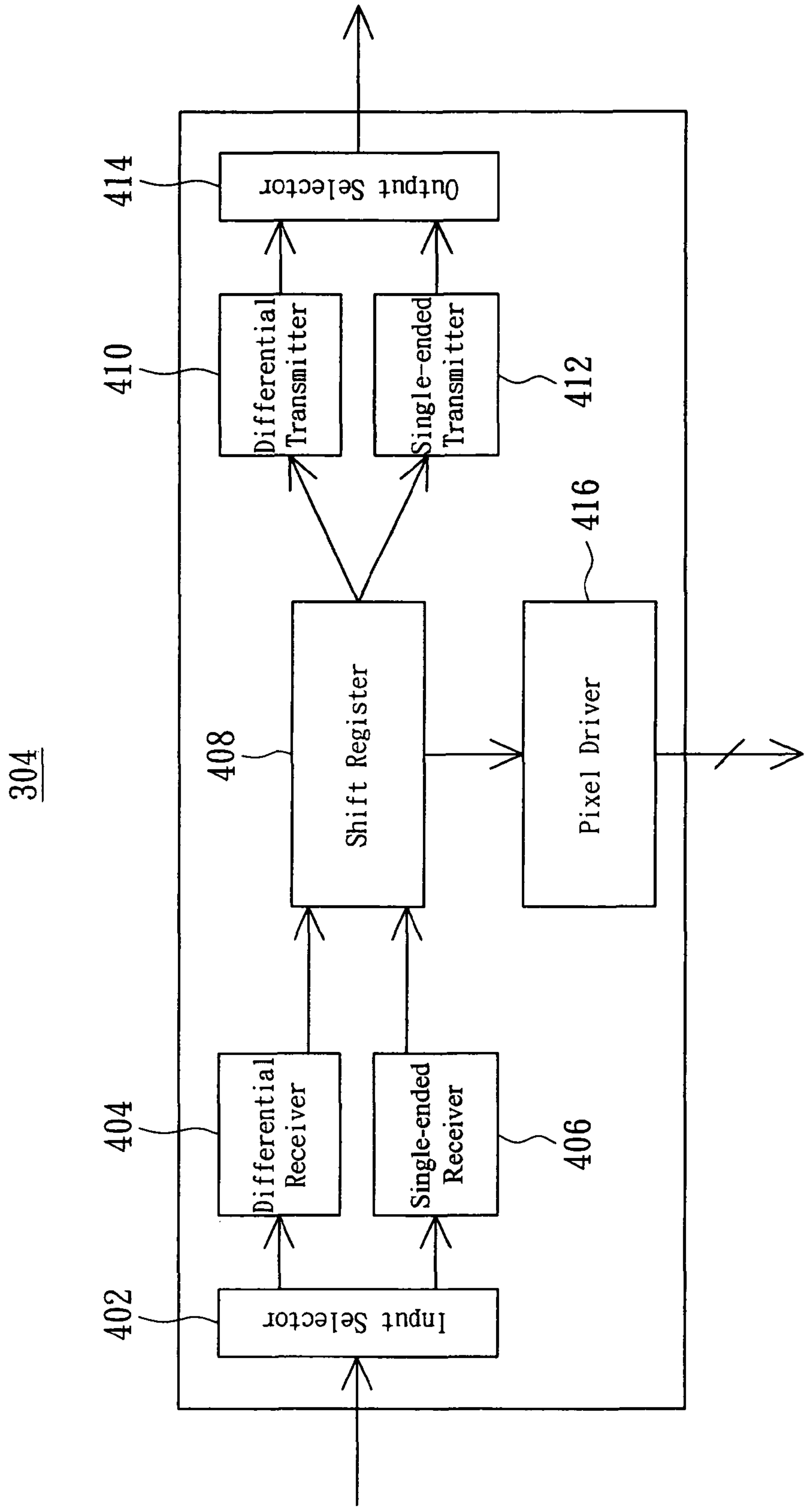
FIG. 4 shows illustration of a driver chip according to a better embodiment of the invention.

FIG. 4 shows illustration of a driver chip according to the preferred embodiment of the invention. Each driver 304 includes input selector 402, differential receiver 404, single-ended receiver 406, shift register 408, differential transmitter 410, single-ended transmitter 414, output selector 414, and pixel driver 416.

Driver chip 304 has a preset receiving mode and a preset output mode, wherein the preset receiving mode can be a differential mode or a single-ended mode, and the preset output mode also can be a differential mode or a single-ended mode. Driver chip 304 receives the pixel signal according to the preset receiving mode of the driver chip 304, and output the pixel signal according to the preset output mode of the driver chip 304. Input selector 402 is for outputting the pixel signal after receiving the pixel signal: when input selector 402 preset receiving mode is the differential mode, the differential receiver 404 is enabled by input selector 402 to receive the pixel signal, and convert the pixel signal into an internal signal before outputting, and the internal signal in this embodiment is converted into single-ended type; when the preset receiving mode is the single-ended mode, the single-ended receiver 406 is enabled by input selector 402 to receive the pixel signal, and convert the pixel signal into an internal signal before outputting, the internal signal in this, embodiment remains in single-ended type.

Shift register 408 is for receiving and temporarily storing the internal signal from differential receiver 404 or single-ended receiver 406. Differential transmitter 410 is for receiving and converting the internal signal output by shifter register 408, and outputting the pixel signal in differential type; single-ended transmitter 412 is for receiving and converting the internal signal output by shift register 408, and outputting the pixel signal in single-ended type.

Output selector 414 selectively outputs the pixel signal output by differential transmitter 410 or single-ended transmitter 412 according to the preset output mode. When preset output mode is the differential mode, output selector 414 outputs the pixel signal output by differential transmitter 410; when the preset differential mode is the single-ended mode, the output selector 414 outputs the pixel signal output by single-ended transmitter 412. Pixel driver 416 retrieves data corresponding to the driver chip from shift register 408, and drives display panel 308 to display image according to the data.

While the LCD disclosed by the above described embodiment of the invention was demonstrated with driver chips having differential and single-ended receive and output modes, the driver chip can also be only having a differential input and output modes, which will not be further discussed here.

Although the LCD according to the embodiment of the invention transmits data by way of WOA, the pixel signals can be transmitted in differential mode between driver chips in order to prevent pixel signals from being severely attenuated, or can be transmitted alternatively in differential and single-ended mode between the driver chips in order to incorporate both the low power consumption advantage of single-ended signals, and the good signal quality advantage of differential signals. Also, by using differential mode in signal transmitting, high resolution can be easily attained when applying in high resolution LCDs.

While the invention has been described by way of example and in terms of a preferred embodiment, it is to be understood that the invention is not limited thereto. Rather, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display, comprising:

a timing controller for outputting a first pixel signal;

a first driver chip, comprising a first differential receiver, a first single-ended receiver, a first differential transmitter, and a first single-ended transmitter, the first driver chip being electrically connected to the timing controller; and a display panel electrically connected to the first driver chip;

wherein the first driver chip is to utilize either the first differential receiver or the first single-ended receiver of the first driver chip to receive the first pixel signal, and utilize either the first differential transmitter or the first single-ended transmitter of the first driver chip to output a second pixel signal.

2. The display according to claim 1, wherein the first driver chip has a first receiving mode, a second receiving mode, a first output mode and a second output mode, and the first driver chip further comprising a shift register for receiving and temporarily storing a first internal signal and outputting a second internal signal from the shift register.

3. The display according to claim 2, wherein the first internal signal and the second internal signal are both single-ended.

4. The display according to claim 2, wherein the first driver chip further comprises an input selector for selectively providing the first pixel signal to the first differential receiver of the first driver chip in the first receiving mode and to the first single-ended receiver of the first driver chip in the second receiving mode.

5. The display according to claim 2, wherein the first driver chip further comprises an output selector for selectively outputting the second pixel signal generated by the first differential transmitter of the first driver chip in the first output mode, and outputting the second pixel signal generated by the first single-ended transmitter of the first driver chip in the second output mode.

6. The display according to claim 2, wherein the first driver chip further comprises a pixel driver for retrieving either the first internal signal or the second internal signal from the shift register and driving the display panel to display image according to either the first or the second internal signal.

7. The display according to claim 1, the first driver chip having a first receiving mode, a second receiving mode, a first output mode, and a second output mode, and the first driver chip further comprising:

a first input selector for selectively providing the first pixel signal to the first differential receiver of the first driver chip in the first receiving mode and to the first single-ended receiver of the first driver chip in the second receiving mode; and a first output selector for selectively outputting the second pixel signal generated by the first differential transmitter of the first driver chip in the first output mode, and outputting the second pixel signal generated by the first single-ended transmitter of the first driver chip in the second output mode.

8. The display according to claim 7, wherein the first input selector is preset for providing the first pixel signal to the first differential receiver, and the first output selector is preset for outputting the second pixel signal generated by the first single-ended transmitter.

9. The display according to claim 7, wherein the first input selector is preset for providing the first pixel signal to the first differential receiver, and the first output selector is preset for outputting the second pixel signal generated by the first differential transmitter.

10. The display according to claim 7, wherein the first input selector is preset for providing the first pixel signal to the first single-ended receiver, and the first output selector is preset for outputting the second pixel signal generated by the first single-ended transmitter.

11. The display according to claim 7, wherein the first input selector is preset for providing the first pixel signal to the first single-ended receiver, and the first output selector is preset for outputting the second pixel signal generated by the first differential transmitter.

12. The display according to claim 1, further comprising:

a second driver chip, comprising a second differential receiver, a second single-ended receiver, a second differential transmitter, and a second single-ended transmitter, the second driver chip being electrically connected to the first driver chip;

wherein the second driver chip is to utilize either the second differential receiver or the second single-ended receiver of the second driver chip to receive the second pixel signal, and utilize either the second differential transmitter or the second single-ended transmitter of the second driver chip to output a third pixel signal.

13. The display according to claim 12, the first driver chip having a first receiving mode, a second receiving mode, a first output mode, and a second output mode, and the first driver chip further comprising:

a first input selector for selectively providing the first pixel signal to the first differential receiver of the first driver chip in the first receiving mode and to the first single-ended receiver of the first driver chip in the second receiving mode; and a first output selector for selectively outputting the second pixel signal generated by the first differential transmitter of the first driver chip in the first output mode, and outputting the second pixel signal generated by the first single-ended transmitter of the first driver chip in the second output mode.

14. The display according to claim 13, wherein the first receiving mode is a differential receiving mode, the second receiving mode is a single-ended receiving mode, the first output mode is a differential output mode, and the second output mode is a single-ended output mode.

15. The display according to claim 13, the second driver chip having the first receiving mode, the second receiving mode, the first output mode, and the second output mode, and the second driver chip further comprising:

a second input selector for selectively providing the second pixel signal to the second differential receiver of the second driver chip in the first receiving mode and to the second single-ended receiver of the second driver chip in the second receiving mode; and a second output selector for selectively outputting the third pixel signal generated by the second differential transmitter of the second driver chip in the first output mode, and outputting the third pixel signal generated by the second single-ended transmitter of the second driver chip in the second output mode.

16. The display according to claim 15, wherein the first input selector is preset for providing the first pixel signal to the first differential receiver, and the first output selector is preset for outputting the second pixel signal generated by the first single-ended transmitter.

17. The display according to claim 16, wherein the second input selector is preset for providing the second pixel signal to the second single-ended receiver, and the second output selector is preset for outputting the third pixel signal generated by the second single-ended transmitter.

18. The display according to claim 16, wherein the second input selector is preset for providing the second pixel signal to the second single-ended receiver, and the second output selector is preset for outputting the third pixel signal generated by the second differential transmitter.

19. The display according to claim 15, wherein the first input selector is preset for providing the first pixel signal to the first differential receiver, and the first output selector is preset for outputting the second pixel signal generated by the first differential transmitter.

20. A liquid crystal display, comprising:

a timing controller for outputting a first pixel signal;

a first driver chip, comprising a first differential receiver, a first single-ended receiver, and a first differential transmitter, the first driver chip being electrically connected to the timing controller; and a display panel electrically connected to the first driver chip;

wherein the first driver chip is to utilize either the first differential receiver or the first single-ended receiver of the first driver chip to receive the first pixel signal, and utilize the first differential transmitter of the first driver chip to output a second pixel signal.

21. The display according to claim 20, wherein the first driver chip has a first receiving mode, a second receiving mode, and a first output mode, and the first driver chip further comprising a shift register for receiving and temporarily storing a first internal signal and outputting a second internal signal from the shift register.

22. The display according to claim 21, wherein the first driver chip further comprises an input selector for selectively providing the first pixel signal to the first differential receiver of the first driver chip in the first receiving mode and to the first single-ended receiver of the first driver chip in the second receiving mode.

23. The display according to claim 21, wherein the first driver chip further comprises a pixel driver for retrieving either the first internal signal or the second internal signal from the shift register and driving the display panel to display image according to either the first or the second internal signal.

24. The display according to claim 20, the first driver chip having a first receiving mode, a second receiving mode, and a first output mode, and the first driver chip further comprising:

a first input selector for selectively providing the first pixel signal to the first differential receiver of the first driver chip in the first receiving mode and to the first single-ended receiver of the first driver chip in the second receiving mode.

25. The display according to claim 20, further comprising:

a second driver chip, comprising a second differential receiver and a second differential transmitter, the second driver chip being electrically connected to the first driver chip;

wherein the second driver chip is to utilize the second differential receiver of the second driver chip to receive the second pixel signal, and utilize the second differential transmitter of the second driver chip to output a third pixel signal.

26. The display according to claim 25, the first driver chip having a first receiving mode, a second receiving mode, and a first output mode, and the first driver chip further comprising:

a first input selector for selectively providing the first pixel signal to the first differential receiver of the first driver chip in the first receiving mode and to the first single-ended receiver of the first driver chip in the second receiving mode.

27. The display according to claim 26, wherein the first receiving mode is a differential receiving mode, the second receiving mode is a single-ended receiving mode, and the first output mode is a differential output mode.

28. The display according to claim 26, the second driver chip having the first receiving mode and the first output mode.

29. A liquid crystal display, comprising:

a timing controller for outputting a first pixel signal;

a first driver chip, comprising a first differential receiver, a first single-ended receiver, and a first single-ended transmitter, the first driver chip being electrically connected to the timing controller; and a display panel electrically connected to the first driver chip;

wherein the first driver chip is to utilize either the first differential receiver or the first single-ended receiver of the first driver chip to receive the first pixel signal, and utilize the first single-ended transmitter of the first driver chip to output a second pixel signal.

30. The display according to claim 29, wherein the first driver chip has a first receiving mode, a second receiving mode, and a second output mode, and the first driver chip further comprising a shift register for receiving and temporarily storing a first internal signal and outputting a second internal signal from the shift register.

31. The display according to claim 30, wherein the first driver chip further comprises an input selector for selectively providing the first pixel signal to the first differential receiver of the first driver chip in the first receiving mode and to the first single-ended receiver of the first driver chip in the second receiving mode.

32. The display according to claim 30, wherein the first driver chip further comprises a pixel driver for retrieving either the first internal signal or the second internal signal from the shift register and driving the display panel to display image according to either the first or the second internal signal.

33. The display according to claim 29, the first driver chip having a first receiving mode, a second receiving mode, and a second output mode, and the first driver chip further comprising:

a first input selector for selectively providing the first pixel signal to the first differential receiver of the first driver chip in the first receiving mode and to the first single-ended receiver of the first driver chip in the second receiving mode.

34. The display according to claim 29, further comprising:

a second driver chip, comprising a second single-ended receiver and a second single-ended transmitter, the second driver chip being electrically connected to the first driver chip;

wherein the second driver chip is to utilize the second single-ended receiver of the second driver chip to receive the second pixel signal, and utilize the second single-ended transmitter of the second driver chip to output a third pixel signal.

35. The display according to claim 34, the first driver chip having a first receiving mode, a second receiving mode, and a second output mode, and the first driver chip further comprising:

a first input selector for selectively providing the first pixel signal to the first differential receiver of the first driver chip in the first receiving mode and to the first single-ended receiver of the first driver chip in the second receiving mode.

36. The display according to claim 35, wherein the first receiving mode is a differential receiving mode, the second receiving mode is a single-ended receiving mode, and the second output mode is a single-ended output mode.

37. The display according to claim 35, the second driver chip having the second receiving mode and the second output mode.

* * * * *